United States Patent
Morgan et al.

(10) Patent No.: US 7,313,876 B2
(45) Date of Patent: Jan. 1, 2008

(54) FOOTWEAR OUTSOLE AND METHOD OF MANUFACTURE

(75) Inventors: Mark M. Morgan, Rockford, MI (US); Wen-Jong Liu, Shi-Lin (TW)

(73) Assignee: Wolverine World Wide, Inc., Rockford, MI (US)

( * ) Notice: Subject to any disclaimer, the term of this patent is extended or adjusted under 35 U.S.C. 154(b) by 36 days.

(21) Appl. No.: 11/103,857

(22) Filed: Apr. 12, 2005

(65) Prior Publication Data

US 2006/0225305 A1    Oct. 12, 2006

(51) Int. Cl.
*A43C 15/02* (2006.01)

(52) U.S. Cl. .................................... 36/59 R; 36/146 B

(58) Field of Classification Search ............... 36/59 R; 12/146 B
See application file for complete search history.

(56) References Cited

U.S. PATENT DOCUMENTS

| | | | |
|---|---|---|---|
| 2,931,110 A * | 4/1960 | Pietrocola | 36/30 R |
| 4,347,673 A | 9/1982 | Svetlik | |
| 4,899,467 A * | 2/1990 | Mackey | 36/59 A |
| 6,032,388 A * | 3/2000 | Fram | 36/129 |
| 6,430,844 B1 | 8/2002 | Otis | |
| 6,539,646 B2 * | 4/2003 | Brooks et al. | 36/30 R |
| 6,571,491 B2 | 6/2003 | Safdeye et al. | |
| 2002/0035796 A1 * | 3/2002 | Knoche et al. | 36/59 R |
| 2003/0121179 A1 * | 7/2003 | Chen | 36/30 R |
| 2004/0020080 A1 * | 2/2004 | Cox et al. | 36/103 |

* cited by examiner

*Primary Examiner*—Ted Kavanaugh
(74) *Attorney, Agent, or Firm*—Warner Norcross & Judd LLP

(57) ABSTRACT

An outsole construction having an integral display layer. The outsole includes a main body and a plurality of lugs extending from the main body to define a plurality of ground engaging elements. The display layer is disposed at the surface of the main body such that it is visible in the main body of the outsole and is spaced away from the surface of the lugs such that it is not visible on the surface of the lugs. The display layer may include a printed pattern, such as a camouflage pattern. The present invention also provides a method for manufacturing an outsole including the general steps of (a) providing a mold defining a main body and a plurality of lugs extending from the main body, (b) placing a permeable display layer in the mold and (c) injecting sole material into the mold. In this method, the permeability of the display layer and/or the viscosity of the sole material may be selected so that the display layer lies along the surface of the main body of the sole but not the surface of the lugs.

7 Claims, 8 Drawing Sheets

FOOTWEAR OUTSOLE AND METHOD OF MANUFACTURE

BACKGROUND OF THE INVENTION

The present invention relates to footwear and more particularly to an outsole for an article of footwear and a method for manufacturing an outsole.

It is often desirable to provide the sole of an article of footwear with a particular appearance. For example, in footwear intended for use in hunting it is known to provide the outsole with a camouflage pattern. As another example, it is known to provide the outsole of an athletic shoe with an aesthetically pleasing pattern that may, among other things, draw the attention of potential purchasers. There are other applications in which it may be desirable to provide the undersurface of a sole with a desired printed pattern.

One construction for providing a patterned outsole is to laminate a patterned layer to the undersurface of the outsole. In this construction the pattern is on the surface of the outsole where it is clearly visible. Unfortunately, the layer is also exposed to the dangers associated with use. For example, the patterned layer is subjected to wear, scuffing and other damage during use. This wear or other damage can obscure the pattern over time.

Another method for providing a pattern or other display layer to the undersurface of a sole is to sandwich a patterned layer within the sole. In this construction, the patterned layer may be disposed above the outsole and the outsole may be manufactured from a transparent or translucent material that allows the pattern to be seen through the outsole. This construction has the benefit of protecting the patterned layer behind the outsole. Unfortunately, it limits the materials that can be used to manufacture the outsole because the outsole must be at least partially see-through. To the extent it is not fully transparent, the outsole will obscure viewing of the patterned layer. Also, the outsole material can be marred, scuffed or otherwise damaged during use, thereby further obscuring view of the patterned layer.

Accordingly, there remains a longfelt and unmet need for a construction that is simple and inexpensive, but that is durable and aesthetically pleasing.

SUMMARY OF THE INVENTION

The aforementioned problems are overcome by the present invention wherein an outsole having a main body and a plurality of lugs is provided with a permeable display layer that extends along the surface of the main body, but does not extend along the surface of the lugs. In one embodiment, the display layer is manufactured from a fabric that is sufficiently permeable to permit liquid outsole material to pass through and form the lugs during injection molding.

In one embodiment, the outsole is manufactured from an opaque material that obscures view of the display layer when the display layer is not exposed on the surface of the outsole. In this embodiment, the lugs provide an opaque surface that bears a majority of ground contact. As a result, the majority of wear occurs on the lug surfaces where it does not impact the appearance of the display layer.

In one embodiment, the display layer is a layer of camouflage material. The outsole may be manufactured from an opaque material having a color that compliments the camouflage pattern. The camouflage material may be a tricot fabric having a printed camouflage pattern.

In another aspect, the present invention includes a method for manufacturing an outsole including the steps of
(a) providing a mold defining a cavity having main body region and a plurality of lug regions extending from the main body region,
(b) placing a permeable display layer in the mold,
(c) injecting sole material into the mold, and
(d) permitting the sole material to cure while in intimate contact with the display material thereby providing a one-piece sole having a display layer integral with the outsole; wherein the permeability of the display layer and/or the viscosity of the sole material is selected so that the sole material permeates or flows through the display layer at the lug regions so that the display layer is not visible at the surface of the lugs.

The present invention provides a simple and effective outsole construction that permits a display layer to be placed on the undersurface of an outsole. Because the lugs bear a majority of the ground contact, scuffing, marring and wear have little effect on the display layer. Accordingly, the display layer remains visible in good condition for a relatively long time. The manufacturing process is simple and effective and can be implemented without significant changes to existing tooling or other equipment. In some applications, the display layer may simply be closed between the mold halves without any modification to the mold. In these applications the display layer is gripped between the mold halves, for example, between the shut-off portions of the mold. In other applications, the display layer may be held by pins or not held at all.

These and other objects, advantages, and features of the invention will be readily understood and appreciated by reference to the detailed description of the preferred embodiment and the drawings.

DETAILED DESCRIPTION OF THE PREFERRED EMBODIMENT

Figure 1:
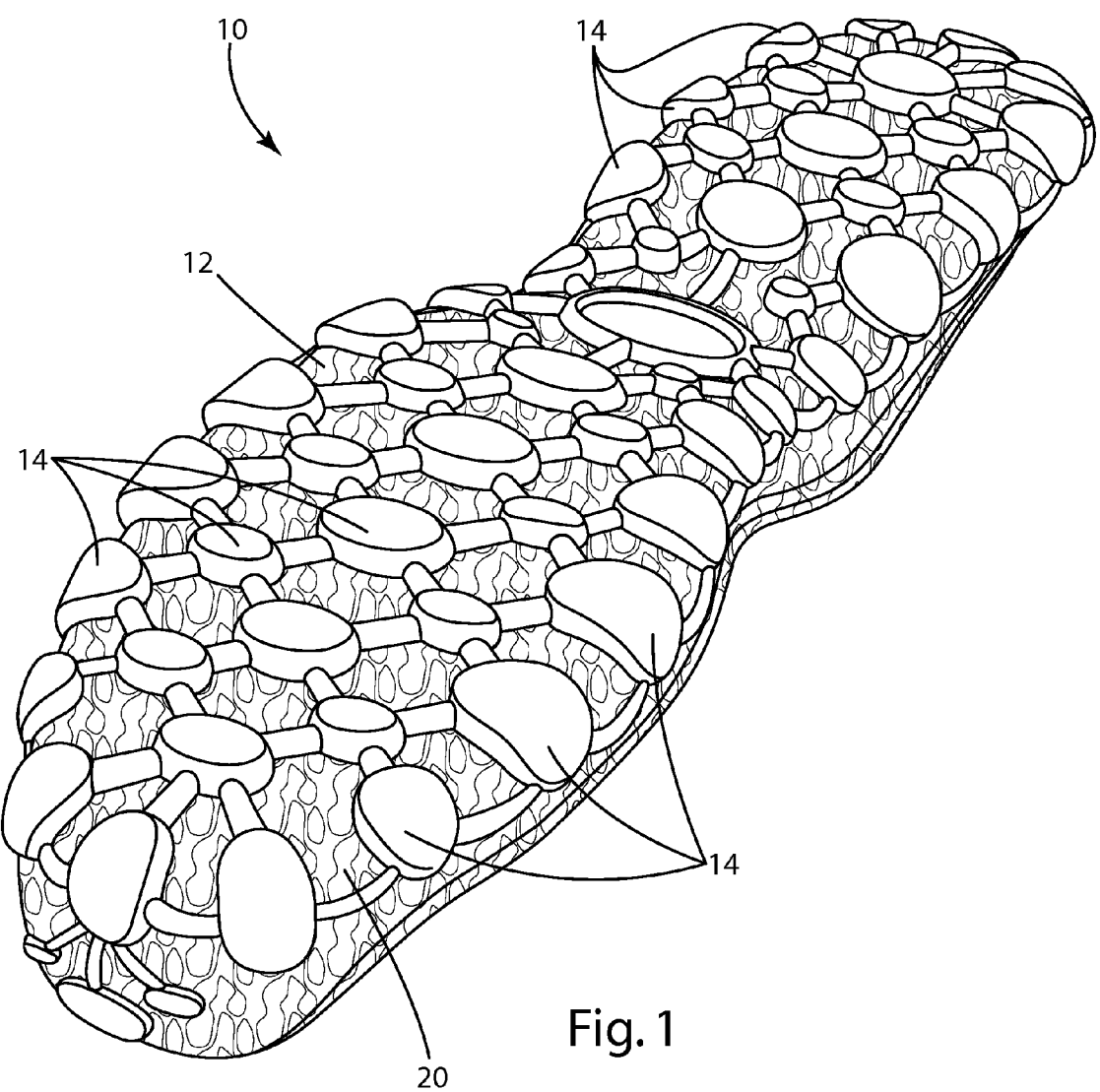
FIG. 1 is a perspective view of an outsole in accordance with an embodiment of the present invention.
Figure 7:
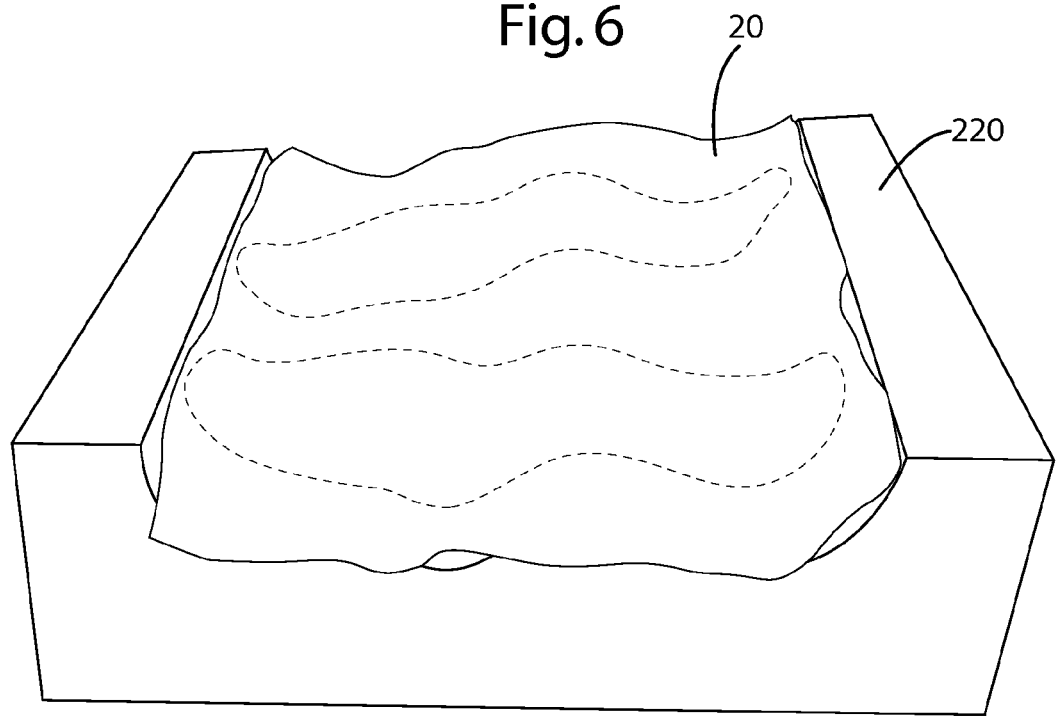
FIG. 7 is a perspective view of the mold with the display layer draped over the lower mold.

An outsole in accordance with an embodiment of the present invention is shown in FIG. 1 and generally designated 10. The outsole 10 generally includes a main body 12 and a plurality of lugs 14 extending down from the main body 12 to define a majority of the ground engaging portion of the outsole 10. A display layer 20 is disposed along the outer surface of the main body 12, but not the outer surface of the lugs 14. The display layer 20 may be printed or otherwise provided with a pattern, image, text or other visual indicia. In such cases, the visual indicia is visible on the surface of the main body 12, but not the lugs 14. In another aspect, the present invention is directed to a method for manufacturing an outsole 10 for an article of footwear including the general steps of:

(a) providing a mold 200 defining a mold cavity 202 with a main body region 204 and plurality of lug regions 206 extending from the main body region 204 (See FIG. 5), (b) inserting a permeable display layer 20 into the mold cavity 202 (See FIG. 7) and (c) injecting sole material 18 into the mold cavity 202; wherein the display layer 20 and/or sole material 18 is selected so that the display layer 20 remains on or embedded in the surface of the material 18 in the main body 12 of the sole 10 and the material 18 passes through the permeable display layer 20 in the lugs 14 so that the display layer 20 is not on the surface of the lugs 14. The present invention is described in connection with a conventional outdoor sole having a plurality of relatively regular, pronounced lugs. It should be understood that the present invention is well-suited for use in soles with other types of lugs, which may include cleats, ribs, bars and other protrusions from the main body 12 of the sole 10.

Figure 2:
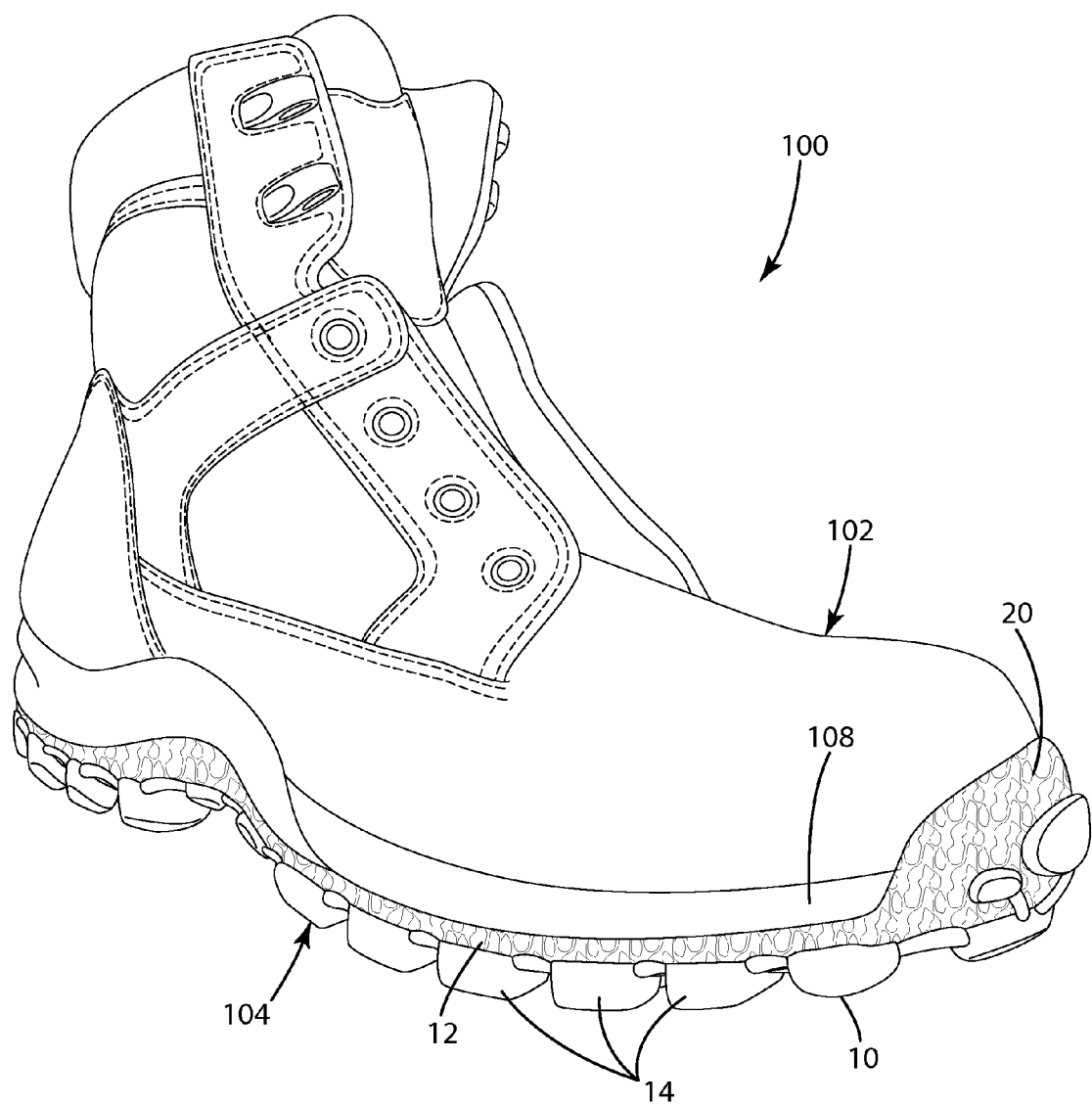
FIG. 2 is a side elevational view of a boot incorporating the outsole.
Figure 3:
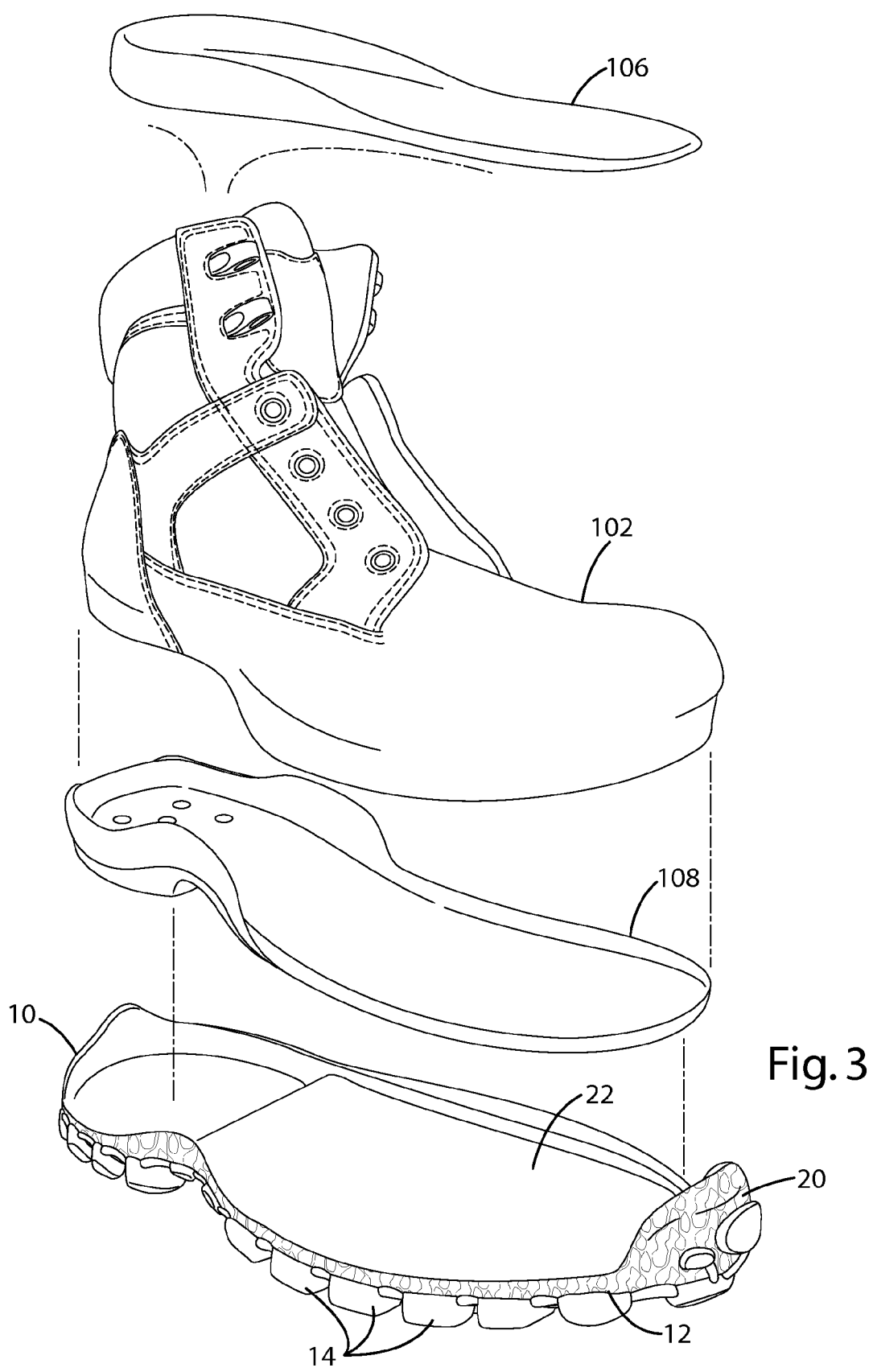
FIG. 3 is an exploded perspective view of the boot.

A boot 100 incorporating the sole 10 is shown in FIG. 2. The boot 100 is shown for disclosure purposes only and is not intended to limit the invention to use with boots. To the contrary, the present invention is well-suited for use with essentially any type of soled footwear. The illustrated boot 100 generally includes an upper 102 and a sole 104 (See FIG. 2). The upper 102 is generally conventional and therefore will not be described in detail. The upper 102 is affixed to the sole 10 using essentially any attachment construction. For example, the sole 10 may be cemented, sewn, welted or directly attached to the upper. In the illustrated embodiment, the boot 100 includes a multilayer sole 104 generally including a footbed 106, a midsole 108 and the outsole 10 (See FIG. 3). The footbed 106 is a generally conventional footbed and may be removably fitted within the upper 102 to directly engage the wearer's foot. The midsole 108 is also generally conventional and may be sandwiched between the outsole 10 and the upper 102. In the illustrated embodiment, the midsole 108 is a relatively thick layer of cushioning material that is fitted within a corresponding recess 22 in the upper surface of the outsole 10. The sole 104 may include other conventional components as desired, such as a shank, heel cushion, support plate. The present invention is not limited in use to multilayer sole constructions, but rather may be incorporated into essentially any sole construction. Accordingly, the construction of sole 104 may vary from application to application as desired.

Figure 4:
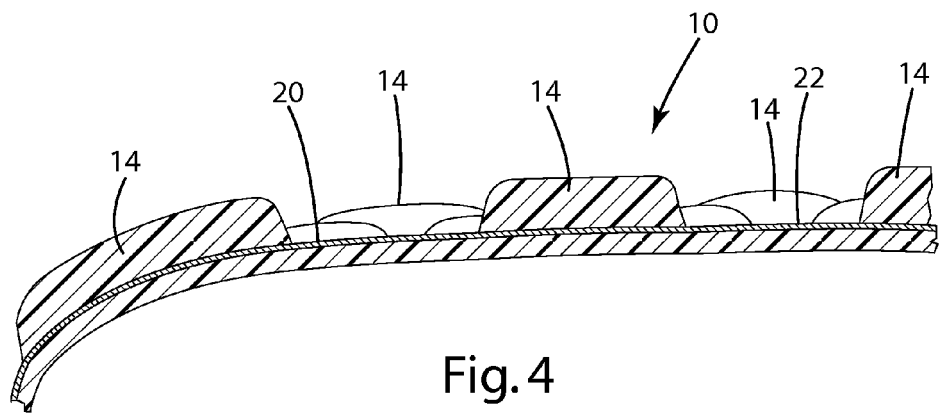
FIG. 4 is a enlarged sectional view of a portion of the outsole.

In the illustrated embodiment, the outsole 10 is a one-piece component having the display layer 20 integrated connected with the sole material 18 (See FIG. 4). As described in more detail below, the outsole 10 is molded with the display layer 20 located within the mold 200 so that the sole material 18 directly adheres to the display layer 20 as it cures. As noted above, the outsole 10 of the illustrated embodiment generally includes a main body 12 and a plurality of lugs 14 that extend from the main body 12 to define a majority of the ground engaging surface of the sole 104. The main body 12 of this embodiment is essentially coextensive with the sole 104 extending from heel to toe and from lateral to medial sides of the boot 100. The outsole 10 need not, however, extend along the entire undersurface of the sole 104. For example, the outsole 10 may include separate heel and forefoot portions (not shown) that are separately secured to the undersurface of the sole 104 or the outsole 10 may extend through only a select portion of the sole 104, such as only through the heel or only through the forefoot region of the sole 104.

In the illustrated embodiment, the outsole 10 is molded from conventional outsole materials, such as polyurethane ("PU"). Alternative outsole materials include without limitation thermoplastic resin ("TPR"), ethylene vinyl acetate ("EVA") and rubber. The outsole material 18 may be opaque and may have a color selected to compliment the display layer 20. For example, if the display layer 20 includes a camouflage pattern, the outsole material 18 may be selected with a color that corresponds with one of the colors in the camouflage pattern. Alternatively, the outsole material 18 may be selected with a color that contrasts with the display layer 20.

The display layer 20 of the described embodiment is a fabric having interstices between the fabric material that permit the sole material to flow through the fabric. In this embodiment, the display layer 20 is a tricot fabric that is manufactured from 100% nylon using a plain weave having 80 grams per square meter. The characteristics of the fabric may vary from application to application provided that it will remain on or embedded in the surface of the main body of the sole while having sufficient permeability to permit the sole material to pass through the fabric in the lugs. Although the present invention is described in connection with a conventional tricot fabric, it is not limited to the use of tricot fabrics, but may instead be used with other fabrics or other types of permeable materials, such as perforated films or other sheet materials. In some applications, fabrics with relatively open weaves will be desired. Open weave fabrics may facilitate the flow of sole material through the fabric to fill the lugs. The characteristics of the sole material may impact the choice of materials for the display layer 20. For example, more viscous materials may require a higher degree of permeability (e.g. a more open weave or a more perforated material) to provide appropriate flow-through of the sole material into the lug regions.

Figure 5:
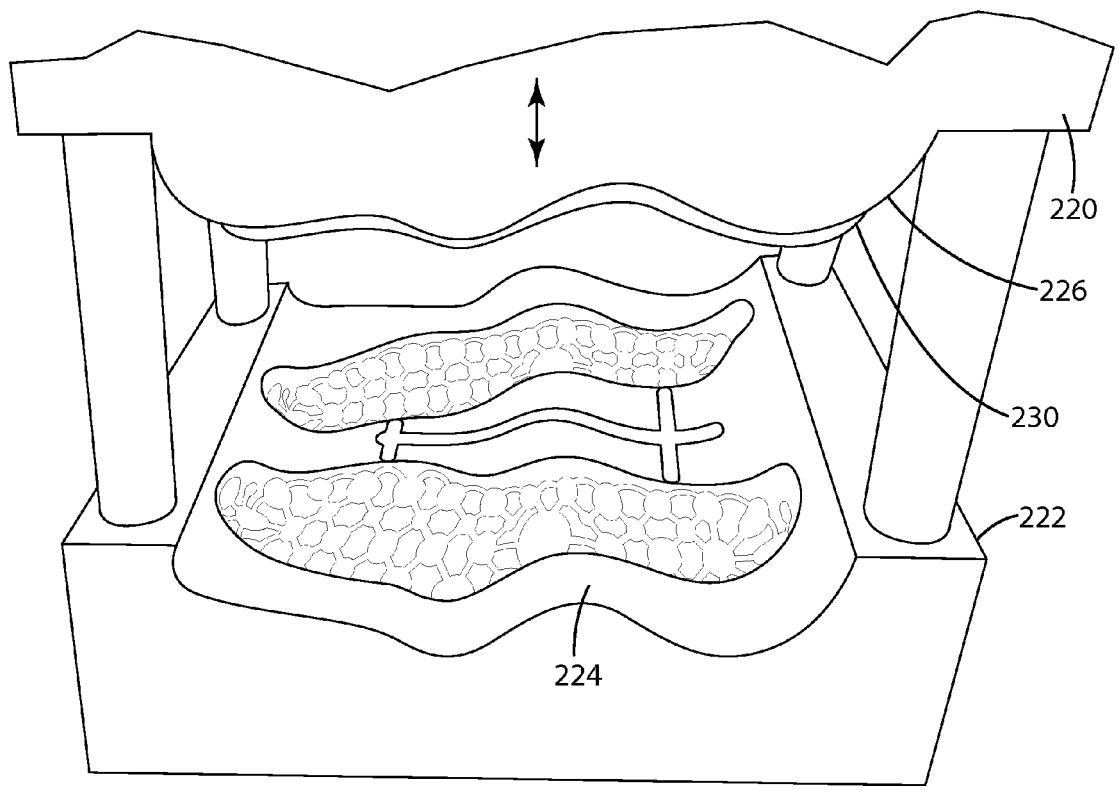
FIG. 5 is a perspective view of a mold.
Figure 6:
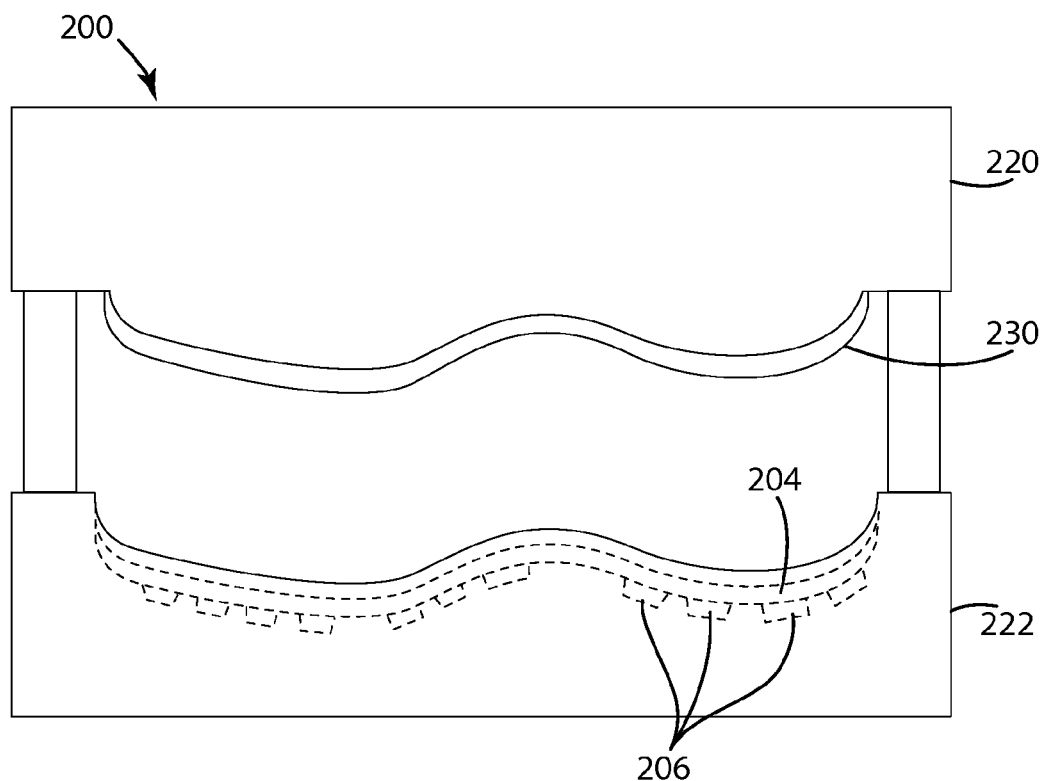
FIG. 6 is a side elevational view of the mold.
Figure 8:
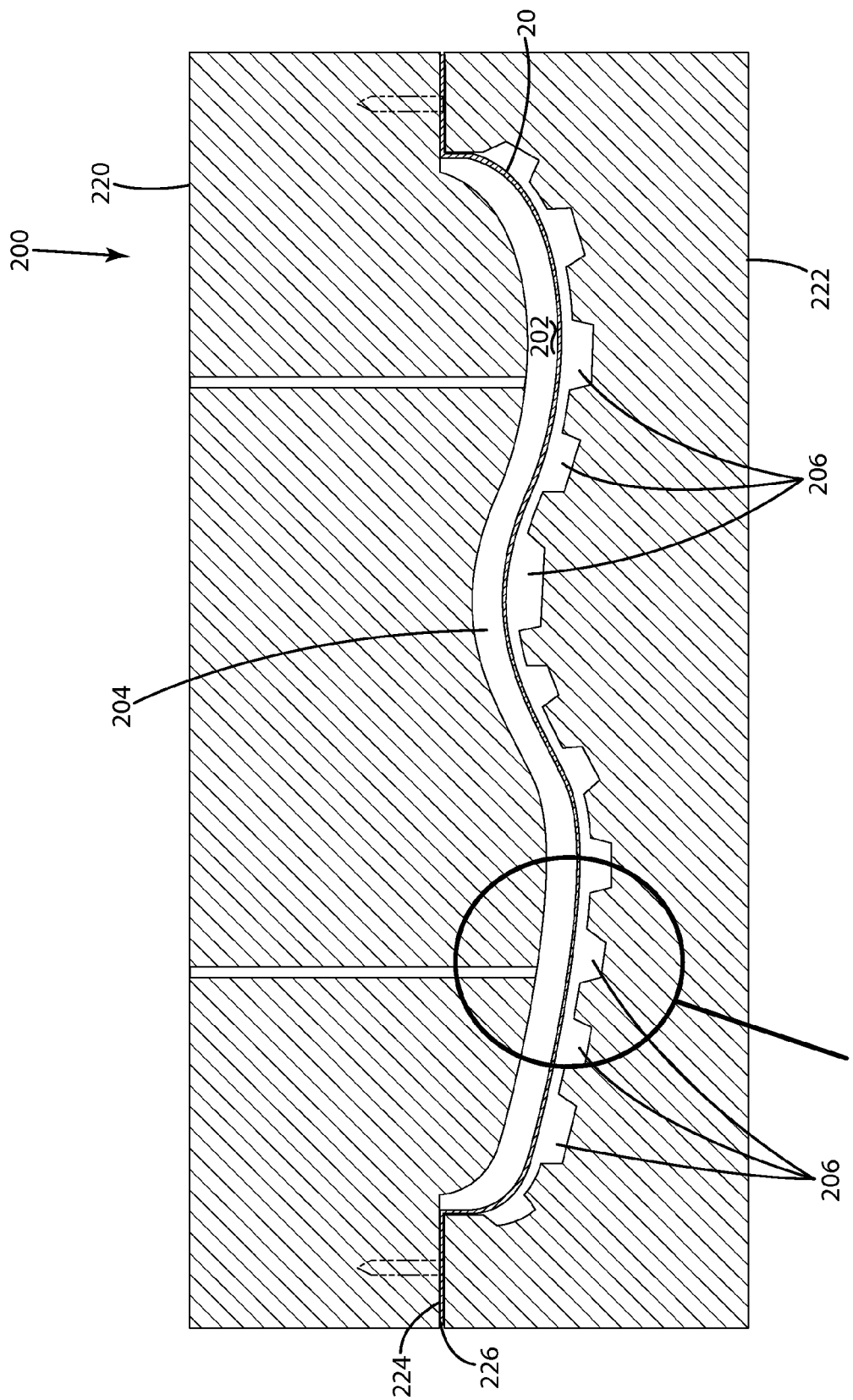
FIG. 8 is a sectional view of the closed mold showing the mold cavity.
Figure 9:
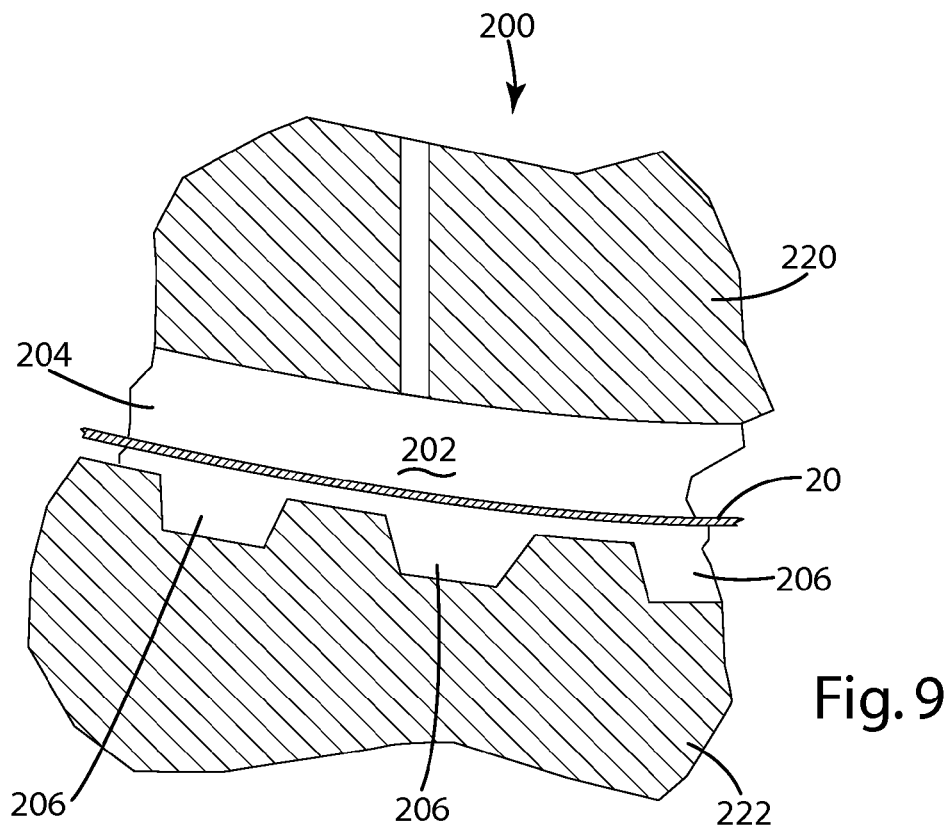
FIG. 9 is an enlarged sectional view of portion IX of the mold of FIG. 8.
Figure 10:
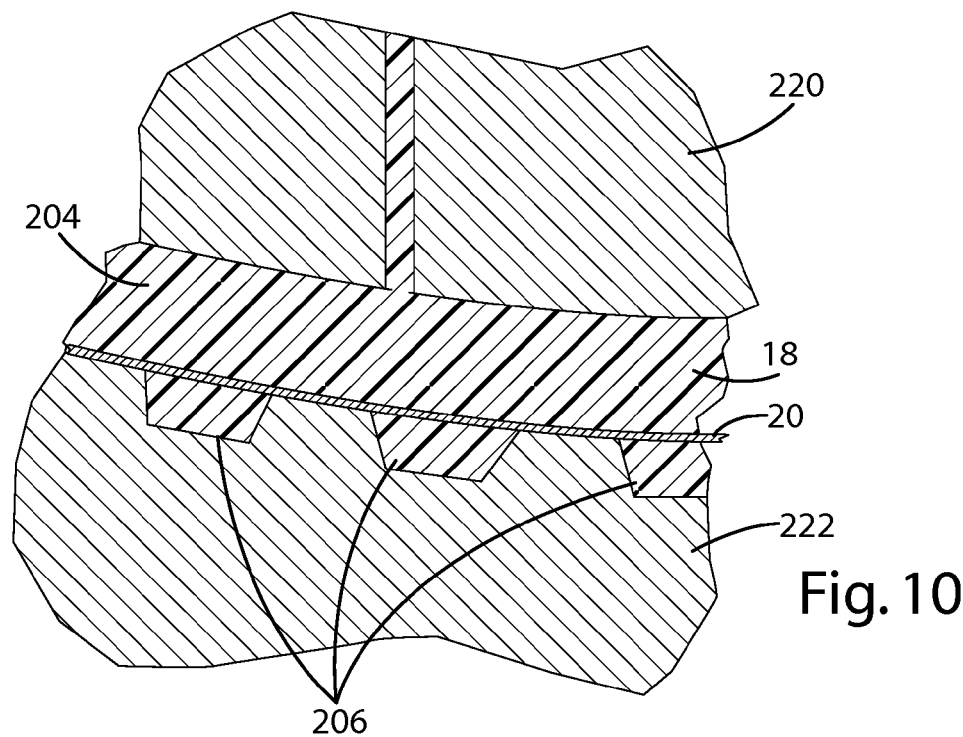
FIG. 10 is an enlarged sectional view similar to that of FIG. 9 showing the mold with injected sole material.
Figure 11:
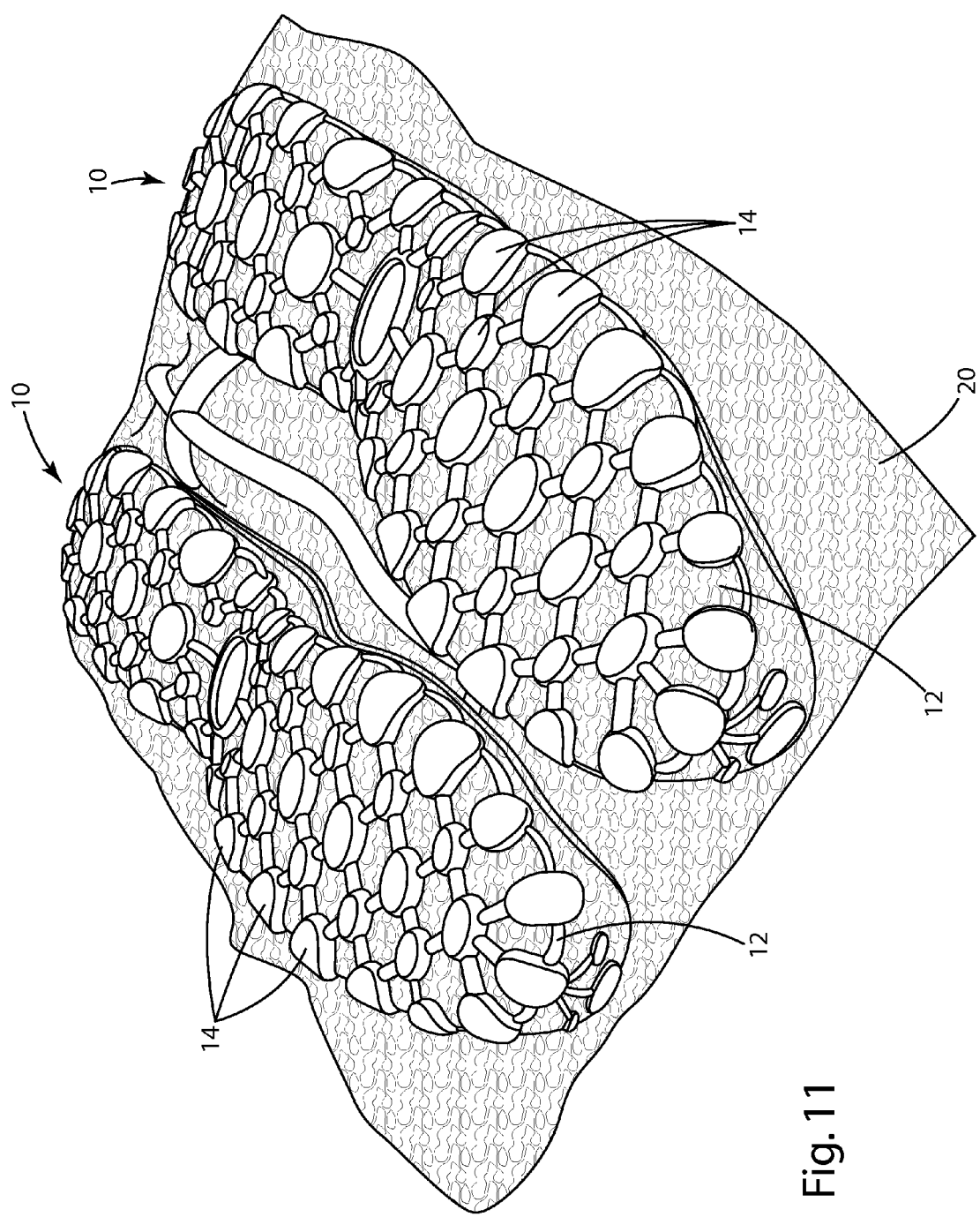
FIG. 11 is a perspective view of a pair of molded outsoles before trimming of excess display layer.

The outsole 10 may be manufactured using conventional injection molding equipment. FIG. 5 illustrates a mold 200 capable of operating in accordance with a manufacturing method of the present invention. The mold 200 generally includes a pair of mold parts 220 and 222 that are selectively movable using conventional equipment, such as hydraulic or pneumatic cylinders (not shown). The mold parts 220 and 222 are contoured to cooperatively define a pair of mold cavities 202 in the desired shape of the pair of outsoles 10. The pair of mold cavities are essentially the mirror-image of one another and are shaped to form matching left and right outsoles 10. Given that the two cavities are essentially identical (except of being the mirror image of one another), this discussion will focus only on one of the two cavities. The mold parts 220 and 222 also include marginal portions 224 and 226 that engage one another when the mold 100 is closed. The marginal portions 224 and 226 include the "shut-off" that prevents liquid sole material 18 from flowing out of the cavity 202. As perhaps best shown in FIG. 6, the upper mold part 220 is contoured to correspond in shape with the upper surfaces of the two outsoles 10. In this embodiment, the upper mold part 220 includes a pair of convex surfaces 230 (only one of which is visible in the drawings) that defines the recesses 22 in the top surfaces of the outsoles 10. The lower mold part 222 is contoured to correspond in shape with the lower surfaces of the outsoles 10. More specifically, the lower mold part 222 is shaped to define a main body region 204 and plurality of lug regions 206 extending from the main body region 204 for each of the two outsoles. As shown in FIG. 8, the lug regions 206 are extensions of the main body region 204 so that material injected into the main body region 204 can flow into the lug regions 206.

Although the illustrated mold 200 is intended to mold a pair of outsoles 10, the mold may alternatively be configured to mold a different number of outsoles. For example, the mold may be configured to individually mold a single outsole. In this alternative, the mold parts (not shown) may include a single mold cavities defining either a left or right outsole. The mold may alternatively be configured to mold more than two outsole by shaping the upper and lower molds to define more than two separate mold cavities.

Manufacture of the outsole 10 using the mold 200 will now be described in connection with FIGS. 5-11. The process begins with the mold 200 in an open position (See FIGS. 5 and 6). In this position, the mold parts 220 and 222 are spaced far enough apart to permit the display layer 20 to be placed between the mold parts 220 and 222, for example, atop the lower mold 222 covering the mold contours. The display layer 20 may be of sufficient size to extend over the entire extents of the lower mold part 222 or may be smaller covering only portions of the lower mold part 222 (See FIG. 7). In alternative applications, the display layer 20 may include two or more separate portions. For example, the display layer may include a forefoot portion that covers the forefoot region of the sole and a separate heel portion that covers the heel region of the sole (not shown). This option may be desirable when different patterns are desired in the forefoot and heel regions or when the outsole includes separate forefoot and heel parts. In the illustrated embodiment, the display layer 20 includes marginal portions that extend beyond the extents of the mold cavity 202 where the marginal portions of the display layer 20 can be sandwiched between the marginal portions 224 and 226 of the mold parts 220 and 222, respectively (See FIG. 8). In this way, the mold parts 220 and 222 cooperatively hold the display layer 20 reducing the likelihood of the display layer 20 being forced down into the lug regions 206 by the flow of injected sole material 18. In alternative embodiments, the display layer 20 may be held by clamps, pins or other mechanical features incorporated into the mold 200 or structures adjacent to the mold 200. Fabric pins 90 are shown in phantom lines in FIG. 8. The tension or amount of slack in the display layer 20 may vary from application to application. For example, in application with a deep mold cavity 202, it may be desirable to include some slack in the display layer 20. The amount of slack may be selected so that the flow of sole material 18 into the mold cavity 202 is capable of pushing the display layer 20 to the surface of the main body of the outsole 10. On the other hand, it may be desirable in some applications to hold the display layer 20 without any slack or even under tension. For example, if the display layer 20 is manufactured from a relatively elastic or stretchable material or if the mold cavity is relatively flat or if the lug regions 206 are relatively large in cross-section, it may be beneficial to hold the display layer 20 without slack or under tension. This may be achieved by holding the display layer 20 with the desired degree of tension while the mold is closed either manually or using supplemental mechanical components, such as clamps, teeth or pins mounted adjacent to the mold parts 220 and 222. In some applications, it may not be necessary to hold the marginal edges of the display layer 20 to prevent the display layer 20 from being pushed down to the surface of the lugs 14. For example, if the display layer 20 has sufficient stiffness, the sole material 18 has a sufficiently low viscosity or the lug regions 206 have a sufficiently small cross section, it may not be necessary to hold the display layer 20 to prevent it from being pushed down into the lugs.

Once the display layer 20 is placed between the mold parts 220 and 222, the mold 200 is closed. As noted above, the mold parts 220 and 222 in this embodiment hold the periphery of the display layer 20 (See FIGS. 8 and 9). More specifically, the peripheral portion of the display layer 20 is sandwiched and held between the marginal portions 224 and 226 of the closed mold parts 220 and 222.

Liquid sole material 18 is then injected into the mold 200. The material 18 may be introduced into the mold 200 above the display layer 20 so that flow of the material 18 pushes the display layer 20 down against the surface of the lower mold part 222. The precise location of the injection inlets may vary from application to application, but in the illustrated embodiment, a first injection inlet is located approximately at the center of the forefoot region and a second injection inlet is located approximately at the center of the heel region. Additional sprues and runners may interconnect the to cavities. As the sole material 18 pushes against the display layer 20 over the lug regions 206, the permeability of the display layer 20 allows the sole material to pass through the display layer 20, for example, through the interstices between the strands of the fabric weave. As perhaps best shown in FIG. 10, the sole material 18 flows into and fills the lug regions 206. In alternative embodiment, the mold parts 220 and 222 may be configured to define in the outsole in an inverted orientation (not shown). In such applications, it may be desirable to inject the sole material 18 into the mold cavity 202 beneath the display layer 20 so that the sole material 18 pushes the display layer 20 up to the surface of the main body.

Once the appropriate volume of sole material has been injected into the mold cavity 202, the sole material 18 is permitted to cure. Depending on the nature of the sole material 18 curing may occur with the passage of time and/or by cooling. Once the sole material 18 is sufficiently cured, the mold 200 is opened and the outsole 10 is removed (See FIG. 11). The outsole 10 can then be trimmed and finished as desired. The outsole 10 can then be attached to the midsole 108 or directly to the upper 102 using conventional techniques, for example, by stitching, cement or other adhesives. In other applications, the outsole 10 may be directly attached to the upper 102 or to another sole component (e.g. the midsole 108) using conventional techniques and apparatus. For example, the upper 102 or sole component to which the outsole 10 will be attached may be positioned within the mold 200 so that it is directly engaged with and becomes directly attached to the sole material as it cures.

The above description is that of a preferred embodiment of the invention. Various alterations and changes can be made without departing from the spirit and broader aspects of the invention as defined in the appended claims, which are to be interpreted in accordance with the principles of patent law including the doctrine of equivalents. Any reference to claim elements in the singular, for example, using the articles "a," "an," "the" or "said," is not to be construed as limiting the element to the singular.

The invention claimed is:

1. A method for manufacturing a sole component, comprising the steps of:
   (a) providing a mold with a mold cavity defining a main body region and a plurality of lug regions extending from the main body region, (b) placing a fabric display layer in the mold, said fabric display layer having interstices such that the fabric display layer is sufficiently permeable at least in regions adjacent the plurality of lug regions to permit a sole material to pass through the fabric display layer, (c) injecting the sole material into the mold such that the sole material passes between the interstices of the fabric display layer and beyond the fabric display layer into the lug regions, whereby the fabric display layer is disposed at a surface of the main body region and spaced from a surface of the sole material in the plurality of lug regions, and (d) permitting the sole material to cure while in intimate contact with the fabric display layer to form a one-piece sole having a main body and a plurality of lugs extending from the main body, the fabric display layer being visible on a surface of the main body and being embedded in the lugs and not visible on a surface of the lugs.

2. The method of claim 1 wherein at least one of a permeability of the display layer and a viscosity of the sole material is selected so that the display layer lies along the surface of the main body of the sole while the sole material passes through the display layer at the lugs so that the display layer is not visible at the surface of the lugs.

3. The method of claim 2 wherein said placing step includes positioning the display layer on a surface of a mold part.

4. The method of claim 1 further including the step of closing the mold on a peripheral portion of the display layer, whereby the closed mold holds the display layer in place within the mold.

5. The method of claim 4 wherein said injecting step includes injecting sole material into the mold on a side of the display layer opposite the plurality of lug regions, whereby the sole material pushes the display layer against a mold surface and whereby the sole material flows through the display layer to fill the lug regions.

6. The method of claim 5 wherein the mold includes a pair of mold parts and the display layer includes a marginal region extending around an entire periphery of the display layer; and wherein the marginal region is closed between the mold parts to hold the display layer in the mold around the entire periphery of the display layer.

7. The method of claim 6 wherein the fabric display layer includes a camouflage pattern and the outsole material is substantially opaque.

* * * * *